(12) United States Patent
Fu

(10) Patent No.: US 12,406,449 B2
(45) Date of Patent: Sep. 2, 2025

(54) INSPECTION SYSTEM AND INSPECTION METHOD OF BUILDING STRUCTURES BY USING AUGMENTED REALITY BASED ON BUILDING INFORMATION MODELING

(71) Applicant: LEE MING CONSTRUCTION CO., LTD., Taichung (TW)

(72) Inventor: Hsuan-Wei Fu, New Taipei (TW)

(73) Assignee: LEE MING CONSTRUCTION CO., LTD, Taichung (TW)

( * ) Notice: Subject to any disclaimer, the term of this patent is extended or adjusted under 35 U.S.C. 154(b) by 164 days.

(21) Appl. No.: 18/522,199

(22) Filed: Nov. 28, 2023

(65) Prior Publication Data
US 2025/0173976 A1 May 29, 2025

(51) Int. Cl.
G06T 19/00 (2011.01)
G06Q 50/16 (2024.01)
G06T 7/00 (2017.01)
G06V 20/20 (2022.01)

(52) U.S. Cl.
CPC .......... G06T 19/006 (2013.01); G06T 7/97 (2017.01); G06V 20/20 (2022.01); *G06Q 50/16* (2013.01); *G06T 2210/62* (2013.01)

(58) Field of Classification Search
CPC ..... G06T 19/006; G06T 7/97; G06T 2210/62; G06T 7/001; G06T 2207/30132; G06V 20/20; G06Q 50/16
See application file for complete search history.

(56) References Cited

U.S. PATENT DOCUMENTS

| | | | | |
|---|---|---|---|---|
| 8,352,218 | B2 * | 1/2013 | Balla | G06F 30/13 700/98 |
| 9,213,785 | B2 * | 12/2015 | Plewe | G06F 30/00 |
| 9,342,928 | B2 * | 5/2016 | Rasane | G06T 19/006 |
| 10,620,084 | B2 * | 4/2020 | Santarone | G06F 30/13 |
| 10,733,334 | B2 * | 8/2020 | Santarone | G06T 7/001 |
| 10,817,630 | B2 * | 10/2020 | Choi | G06F 17/18 |
| 11,237,534 | B2 * | 2/2022 | Poluri | G06T 19/006 |
| 11,640,486 | B2 * | 5/2023 | Santarone | G06Q 99/00 711/108 |
| 11,847,310 | B2 * | 12/2023 | Nostrini | G06F 3/04845 |
| 12,175,562 | B2 * | 12/2024 | Hutchcroft | G06T 7/55 |
| 12,333,512 | B2 * | 6/2025 | Cella | G02B 26/00 |

(Continued)

*Primary Examiner* — Motilewa Good-Johnson
(74) *Attorney, Agent, or Firm* — Apex Juris, pllc; Cera Oh

(57) ABSTRACT

An inspection system of building structures includes a digital environment integration platform based on Common Data Environment, a physical inspection image corresponding to a structural part model in the Building Information Modeling, a server, and a mobile device. An inspection method of the building structures includes: connecting the server to the digital environment integration platform; recognizing feature data of the physical inspection image and sending the feature data to the server by the mobile device; acquiring the corresponding structural part model from the digital environment integration platform and sending the structural part model and a link of an inspection form to the mobile device by the server, wherein the inspection form complies with ISO 19650 standards; displaying an environment image and an augmented reality element of the structural part model on a screen by the mobile device; linking the mobile device to the inspection form.

20 Claims, 9 Drawing Sheets

(56) References Cited

U.S. PATENT DOCUMENTS

| | | | |
|---|---|---|---|
| 12,333,655 B2* | 6/2025 | Li | G06T 17/05 |
| 2011/0115816 A1* | 5/2011 | Brackney | H05B 47/1965 |
| | | | 700/295 |
| 2021/0073694 A1* | 3/2021 | Yellin | G06Q 30/0635 |
| 2021/0174492 A1* | 6/2021 | Karaaslan | G06T 7/11 |
| 2022/0092858 A1* | 3/2022 | Seneviratne | G06T 19/006 |
| 2022/0164493 A1* | 5/2022 | Li | G06V 20/36 |
| 2022/0189004 A1* | 6/2022 | Stluka | G05B 15/02 |
| 2022/0198191 A1* | 6/2022 | Marsh | G06V 20/10 |
| 2023/0093087 A1* | 3/2023 | Babinowich | G06V 20/176 |
| | | | 345/423 |
| 2024/0111914 A1* | 4/2024 | Fink | G06F 30/27 |
| 2025/0078232 A1* | 3/2025 | Singh | G06Q 50/16 |
| 2025/0173976 A1* | 5/2025 | Fu | G06V 20/20 |

* cited by examiner

INSPECTION SYSTEM AND INSPECTION METHOD OF BUILDING STRUCTURES BY USING AUGMENTED REALITY BASED ON BUILDING INFORMATION MODELING

BACKGROUND OF THE INVENTION

Technical Field

The present invention relates generally to an inspection of building structures, and more particularly to an inspection system and an inspection method of building structures by using augmented reality based on building information modeling.

Description of Related Art

Before the construction of today's buildings, virtual three-dimensional models of the buildings, known as Building Information Modeling (BIM), are commonly created. To ensure the match between the building structures constructed and the Building Information Modeling, structural parts of the building structures (such as beams, columns, window openings, door openings, or other openings) have to be inspected throughout various stages of the construction process to recognize and rectify any errors in time.

A conventional inspection method of the building structures involves an inspector carrying a laptop computer storing the Building Information Modeling and paper inspection forms to a location of the structural parts, which are about to be inspected, at the construction site. The inspector opens the Building Information Modeling in the laptop, searches for the structural parts, which are about to be inspected individually, in the Building Information Modeling, and compares the structural parts in the Building Information Modeling with actual structural parts at the construction site. After the comparison, the inspector records the results on the paper inspection forms.

However, it is time-consuming for the inspector to search for a certain location among the extensive Building Information Modeling, causing delay in inspection operation and resulting in poor efficiency. In addition, recording numerous paper inspection forms at the construction site is prone to operational omissions or recording incorrectly.

Therefore, the conventional inspection method of the building structures still has room for improvement.

BRIEF SUMMARY OF THE INVENTION

In view of the above, the primary objective of the present invention is to provide an inspection system and an inspection method of building structures, which could effectively streamline the inspection process of the structural parts.

The present invention provides an inspection system of building structures including a digital environment integration platform, at least one physical inspection image, a server, and a mobile device. The digital environment integration platform stores at least one structural part model of a building structure. The at least one physical inspection image is an image of the at least one structural part model. The server is connected to the digital environment integration platform. The server records a corresponding relationship between feature data of the at least one physical inspection image and the at least one structural part model. The corresponding relationship further includes a link of an inspection form. The mobile device has a camera module and a screen. The mobile device is connected to the server.

The mobile device captures the at least one physical inspection image through the camera module and recognizes the feature data of the at least one physical inspection image. The mobile device sends the feature data recognized to the server.

The server acquires the at least one structural part model from the digital environment integration platform based on the feature data and the corresponding relationship and sends the at least one structural part model and the link of the inspection form to the mobile device.

The mobile device captures an environment image through the camera module and displays the environment image on the screen. The mobile device overlays the at least one structural part model acquired as an augmented reality element on the environment image displayed on the screen. The mobile device is linked to the inspection form through the link acquired to edit the inspection form.

The present invention provides an inspection method of building structures, including steps of:
  providing a digital environment integration platform storing at least one structural part model of a building structure;
  providing at least one physical inspection image, which is an image of the at least one structural part model;
  providing a server connected to the digital environment integration platform; recording, by the server, a corresponding relationship between feature data of the at least one physical inspection image and the at least one structural part model; the corresponding relationship further includes a link of an inspection form;
  connecting a mobile device to the server;
  capturing, by the mobile device, the at least one physical inspection image through the camera module and recognizing the feature data of the at least one physical inspection image by the mobile device; sending the feature data recognized to the server by the mobile device;
  acquiring the at least one structural part model from the digital environment integration platform by the server based on the feature data and the corresponding relationship and sending the at least one structural part model and the link of the inspection form to the mobile device by the server;
  capturing an environment image through the camera module by the mobile device and displaying the environment image on a screen of the mobile device by the mobile device; overlaying, by the mobile device, the at least one structural part model acquired as an augmented reality element in the environment image displayed on the screen; and
  linking the mobile device to the inspection form through the link acquired to edit the inspection form.

With the aforementioned design, the user could perform the inspection of the structural parts in the building structures by simply carrying the mobile device and the physical inspection images, so that the problem that requires to search for the structural parts, which are about to be inspected one by one, in the Building Information Modeling or the problem that requires to bring along the paper inspection forms could be resolved. The inspection system and the inspection method of the building structures of the present invention could be more convenient for users to perform the inspection of the building structures, thereby effectively streamlining the inspection process of the structural parts.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
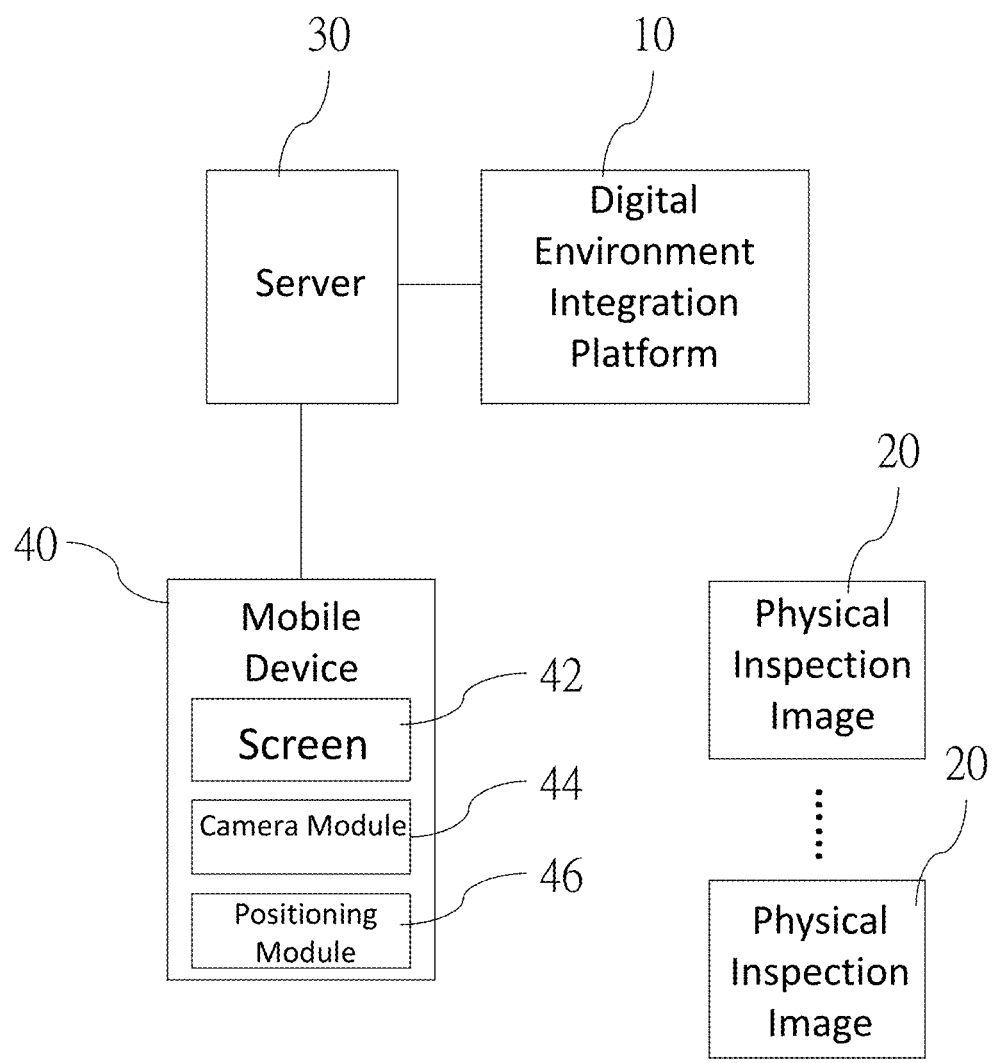
FIG. 1 is a schematic view of the inspection system of the building structures according to a first embodiment of the present invention.
Figure 2:
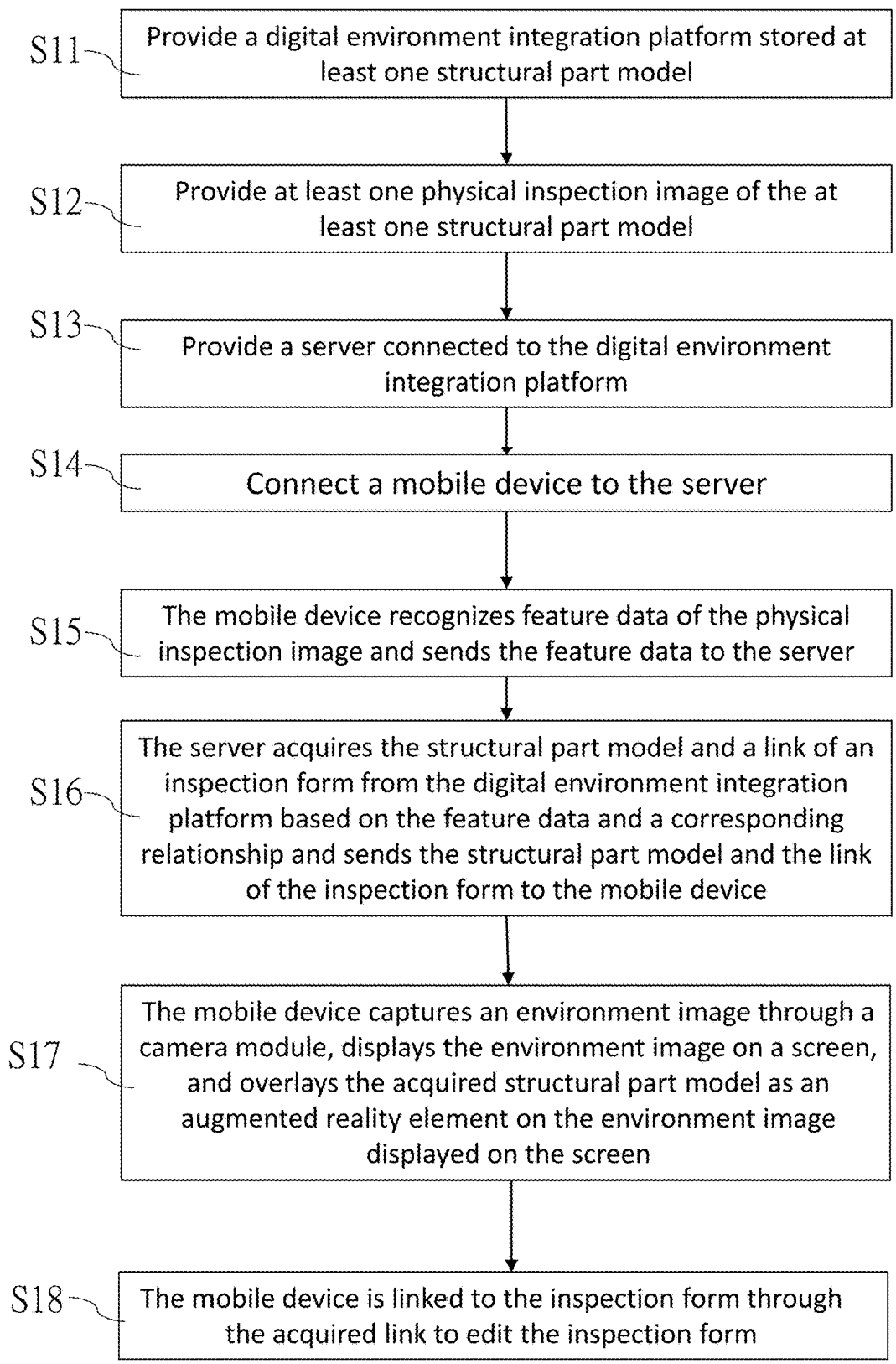
FIG. 2 is a flow chart of the inspection method of the building structures according to the first embodiment of the present invention.

An inspection system of building structures according to a first embodiment of the present invention is shown in FIG. 1 and includes a digital environment integration platform 10, at least one physical inspection image 20, a server 30, and a mobile device 40. The inspection system of the building structures is configured to perform an inspection method of building structures in the current embodiment, wherein the method includes steps S11 to S18 as shown in FIG. 2. The inspection system of the building structures and the inspection method of the building structures would be described as below.

The digital environment integration platform 10 is based on the Common Data Environment (CDE). The digital environment integration platform 10 could be, for example, a database or a cloud storage accessible for relevant participants to connect and access. The digital environment integration platform 10 stores at least one structural part model 50 of a building structure, wherein the at least one structural part model 50 corresponds to a structural part (such as a beam, a column, a window opening, a door opening, or other openings) of the building structure. In the current embodiment, the at least one structural part model 50 includes a plurality of structural part models 50, wherein the plurality of structural part models 50 correspond to a plurality of structural parts. In practice, the digital environment integration platform 10 could be developed by using Unity.

Figure 3:
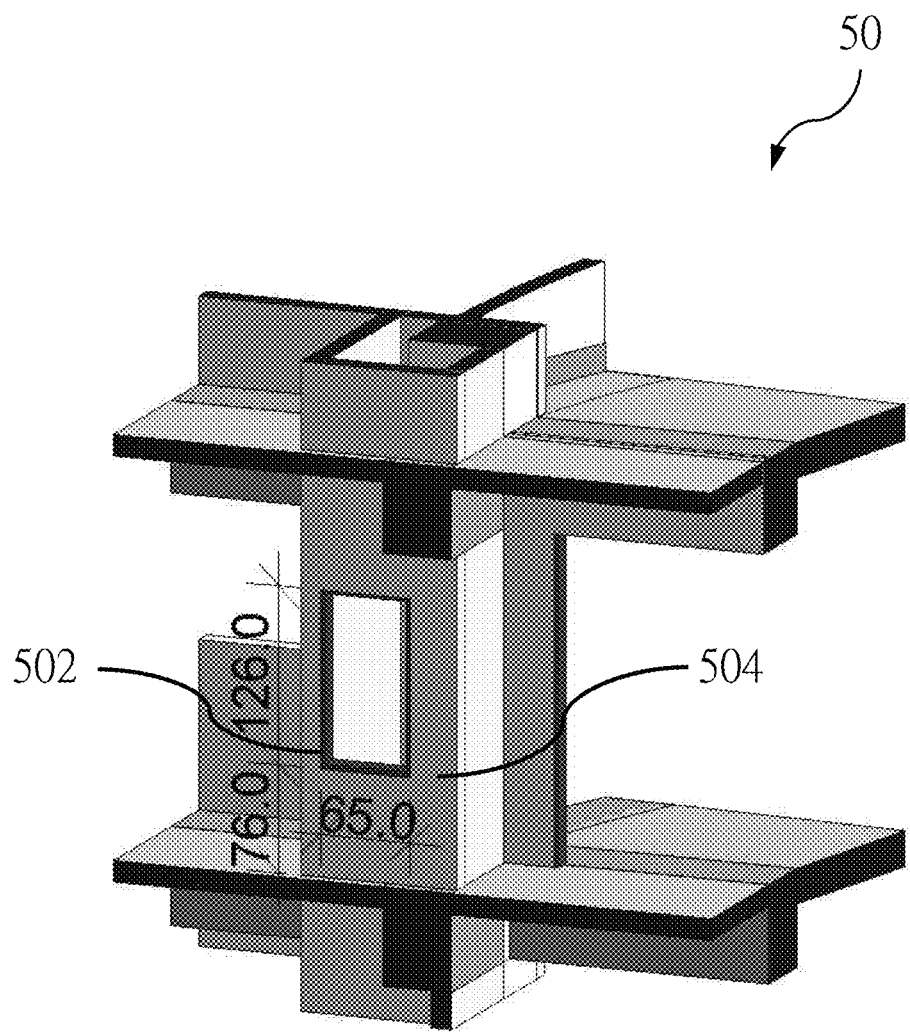
FIG. 3 is a schematic view of the structural part model according to the first embodiment of the present invention.

FIG. 3 shows one of the plurality of the structural part models 50. Each of the plurality of structural part models 50 is one of a plurality of structural part models in the Building Information Modeling (BIM) of the building structure. In the current embodiment, at least one of the plurality of structural part models 50 defines a primary inspection portion 502 and a secondary inspection portion 504. A color of the primary inspection portion 502 is different from a color of the secondary inspection portion 504. For example, an opening shown in FIG. 3 is the primary inspection portion 502 having a color different from the other portions. The primary inspection portion 502 is a portion requiring tighter dimensional tolerances, such as the window opening, the door opening, or the other openings. The primary inspection portion 502 of actual structural parts needs subsequent installations of other elements, such as a door or a frame, so that the tighter dimensional tolerances are required. In practice, the Building Information Modeling could be developed by using Revit.

In the current embodiment, the digital environment integration platform 10 further stores at least one field photo corresponding to at least one of the plurality of structural part models 50. The at least one field photo could be an electronic file of a 360-degree photo captured by a 360-degree camera, but not limited thereto. The at least one field photo is a historical construction photo captured at a location of one of the plurality of structural parts, thereby allowing for subsequent reference. The at least one field photo could be a plurality of field photos respectively corresponding to the plurality of structural part models 50. Each of the plurality of field photos is a historical construction photo in various stages captured at the location of each of the plurality of structural parts.

Figure 4:
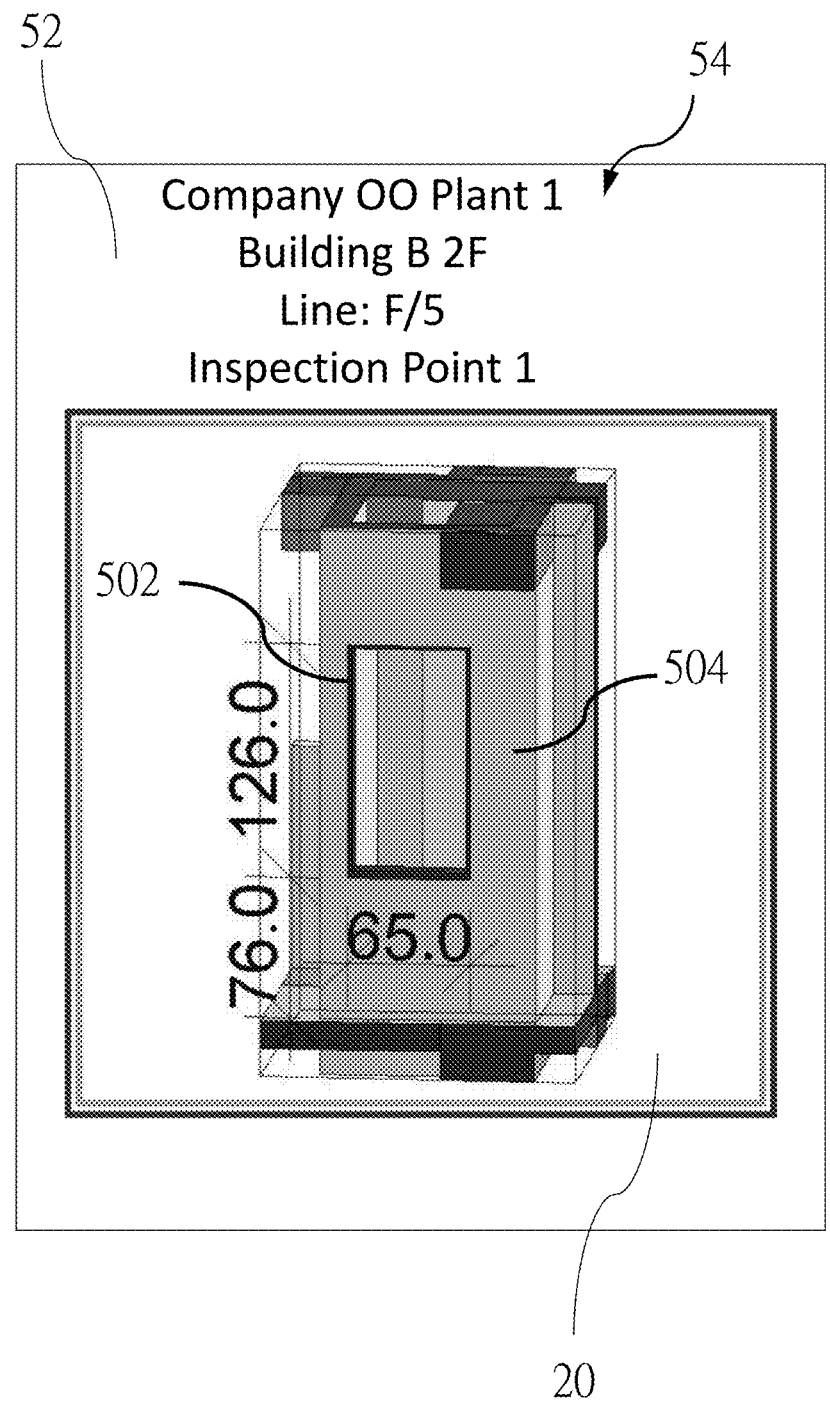
FIG. 4 is a schematic view of the physical inspection image according to the first embodiment of the present invention.
Figure 5:
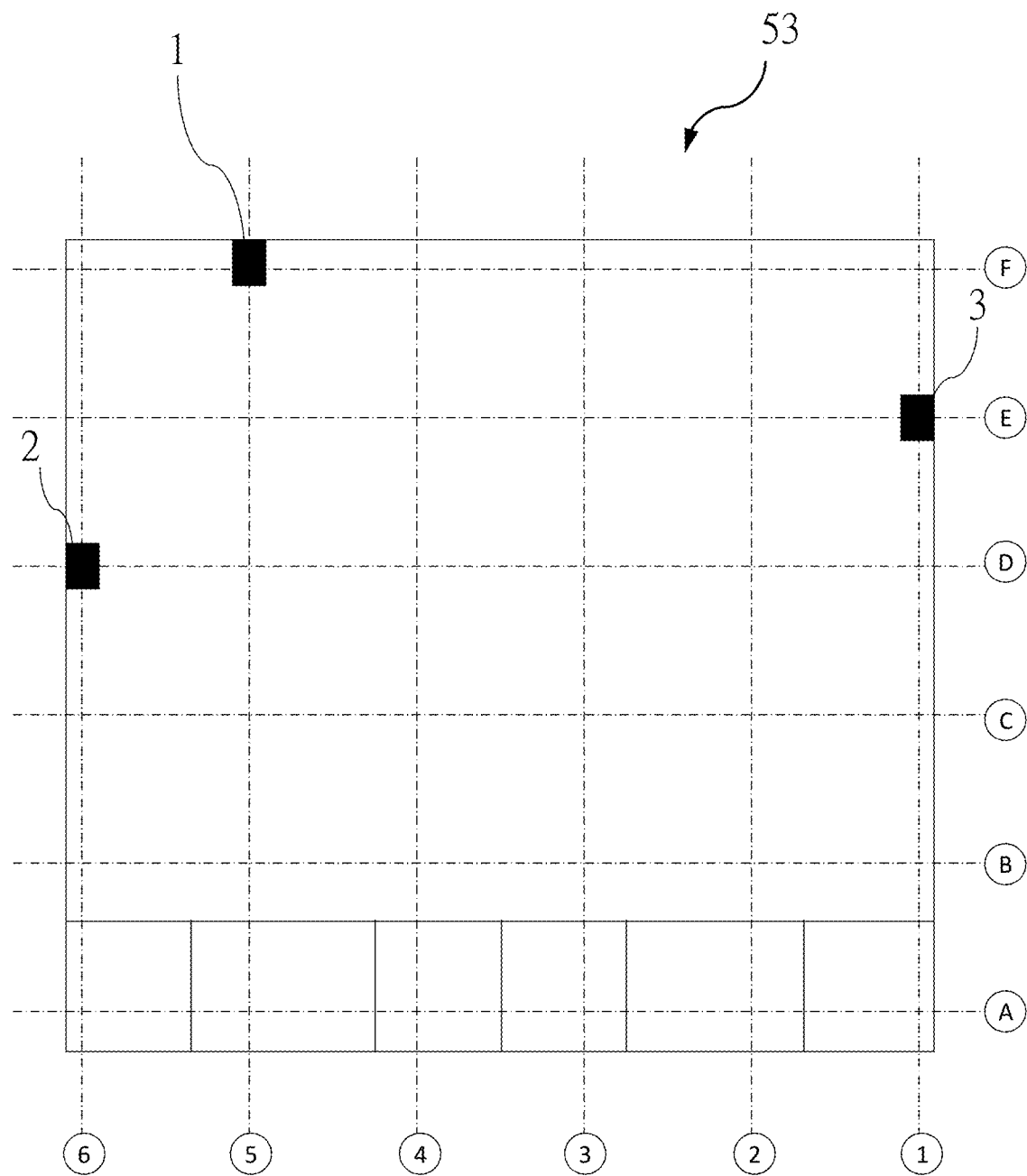
FIG. 5 is a schematic view of the floor plan according to the first embodiment of the present invention.

In the current embodiment, the at least one physical inspection image 20 includes a plurality of physical inspection images 20. Each of the plurality of physical inspection images 20 is printed on a sheet of paper 52 and corresponds to one of the plurality of structural part models 50 in the Building Information Modeling. FIG. 4 shows one of the physical inspection images 20 that corresponds to the structural part model 50 shown in FIG. 3. Personnel prints at least one portion of the structural part model 50 on the paper 52. In addition, location data 54 of the structural part model 50 on a floor plan 53 (shown in FIG. 5) is also printed on the paper 52. The floor plan 53 shown in FIG. 5 includes a plurality of inspection points 1 to 3, wherein the plurality of inspection points 1 to 3 respectively have one corresponding structural part model 50. Taking the structural part model 50 of the inspection point 1 as an example, the location data 54 may include grid (line) location "Line: F/5" and information indicating the location of the structural part model 50, such as a construction site name "Company OO Plant 1", a building name and a floor "Building B 2F", and an inspection point name "Inspection Point 1". The structural part model 50 and the physical inspection image 20 are further marked with dimensions associated with the primary inspection portion 502 for user reference.

The server 30 is connected to the digital environment integration platform 10 and is configured to access data in the digital environment integration platform 10. In practice, the digital environment integration platform 10 could also be integrated with the server 30 in a host. In practice, the server 30 could be developed by using GitHub. The server 30 records a corresponding relationship between feature data of each of the plurality of physical inspection images 20 and each of the plurality of structural part models 50. The corresponding relationship further includes a link of an inspection form corresponding to each of the plurality of structural part models 50. Each of the inspection forms is in an electronic file stored in the cloud storage; each of the links is configured to be linked to the inspection form in the cloud storage, but not limited thereto; each of the inspection forms could also be stored in the digital environment integration platform 10. Each of the inspection forms complies with ISO 19650 standards. In practice, the feature data of the plurality of physical inspection images 20 could be created by using Vuforia, which uses the technology of Marker Augmented Reality (Marker AR).

The mobile device 40 is connected to the server 30. In the current embodiment, the mobile device 40 could be a device convenient for a user (such as an inspector) to carry and connect to the server 30 through the Internet, such as a smartphone, a tablet, a notebook, etc. The mobile device 40 has a screen 42, a camera module 44, and a positioning module 46. The screen 42 could be a touch screen as an example.

The mobile device 40 executes an application software to be connected to the server 30, and then the user inputs an account and a password in the mobile device 40 to log in the server 30. The positioning module 46 of the mobile device 40 is configured to acquire positioning data. For example, the positioning module 46 may acquire the positioning data through an indoor positioning device (not shown) disposed at a current floor of a construction site of the building structure; the indoor positioning device could position by using wireless signals, such as WIFI or Bluetooth; the mobile device 40 acquires the positioning data based on the wireless signals received by the positioning module 46.

The user takes out one of the plurality of paper physical inspection images 20 ready for use when walking to the inspection point, which is about to be inspected, of the construction site of the building structure.

Afterward, the user operates the mobile device 40 to scan the physical inspection image 20, that is, the mobile device 40 captures the physical inspection image 20 through the camera module 44 and recognizes the feature data thereof. The mobile device 40 sends the feature data to the server 30.

The server 30 acquires corresponding one of the structural part models 50 from the digital environment integration platform 10 based on the feature data and the corresponding relationship. The server 30 sends the corresponding structural part model 50 and the corresponding link of the inspection form to the mobile device 40.

Figure 6:
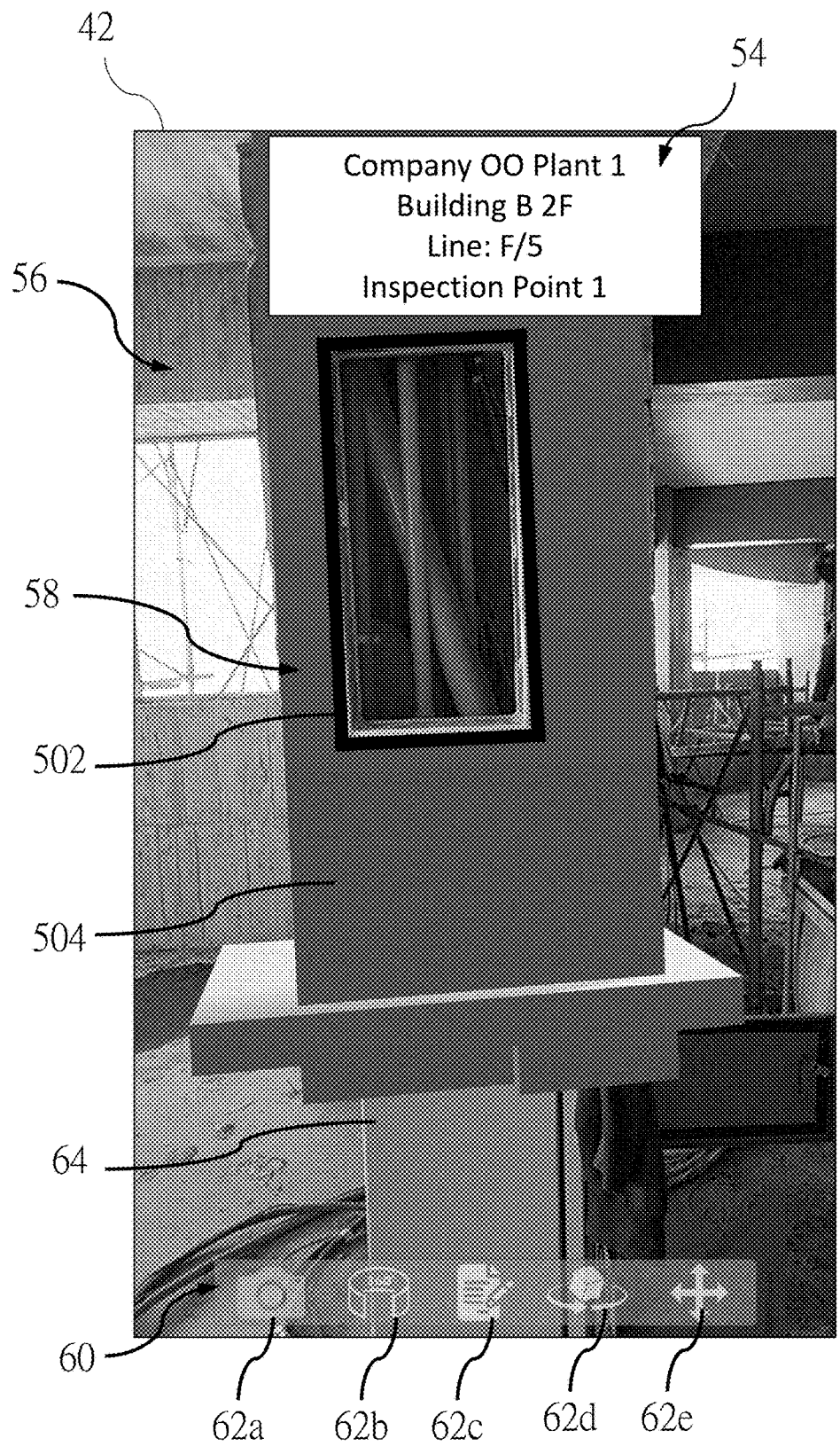
FIG. 6 is a schematic view of the augmented reality element and the environment image displayed on the screen according to the first embodiment of the present invention.

As shown in FIG. 6, the mobile device 40 continuously captures an environment image 56 of the construction site through the camera module 44 and displays the environment image 56 on the screen 42 of the mobile device 40. The mobile device 40 overlays the structural part model 50 acquired as an augmented reality element 58 on the environment image 56 displayed on the screen 42.

In the current embodiment, the corresponding relationship recorded by the server 30 further includes the location data 54 corresponding to each of the plurality of structural part models 50. In the step of sending the structural part model 50 and the corresponding link of the inspection form to the mobile device 40 by the server 30, the server 30 further sends the location data 54 corresponding to the structural part model 50 to the mobile device 40; the mobile device 40 displays the location data 54 on the screen 42.

In the current embodiment, when the mobile device 40 displays the augmented reality element 58 on the screen 42, the primary inspection portion 502 and the secondary inspection portion 504 are displayed simultaneously. The color of the primary inspection portion 502 is different from the color of the secondary inspection portion 504. As shown in FIG. 6, an opening of the augmented reality element 58 is displayed in a deeper color to remind the user to pay attention to the primary inspection portion 502 and to compare the primary inspection portion 502 with a primary inspection portion (such as the opening) of a structural part 64 in detail. Preferably, the primary inspection portion 502 of the augmented reality element 58 could be marked with dimensions associated with the primary inspection portion 502 shown in FIG. 3 and FIG. 4, so that the user could compare the actual dimensions of the primary inspection portion of the structural part 64 measured with a tape measure at the construction site with the dimensions marked in the primary inspection portion 502 of the augmented reality element 58.

In the current embodiment, the mobile device 40 displays a manipulation interface 60 on the screen 42; the manipulation interface 60 includes a plurality of manipulation icons 62a to 62e; the manipulation icon 62a is configured to store the environment image 56 as a static image file and to store the environment image 56 overlaid with the augmented reality element 58 as another static image file; the manipulation icon 62b is configured to display the at least one field photo; the manipulation icon 62c is configured to be linked to the inspection form; the manipulation icon 62d is configured to rotate the augmented reality element 58; the manipulation icon 62e is configured to pan the augmented reality element 58. Additionally, other manipulation icons could be included to zoom in and out of the augmented reality element 58. The user could rotate, pan, zoom in, and zoom out the augmented reality element 58 with fingers on the screen 42, so that the user could compare the augmented reality element 58 with the structural part 64 in the environment image 56.

Figure 7:
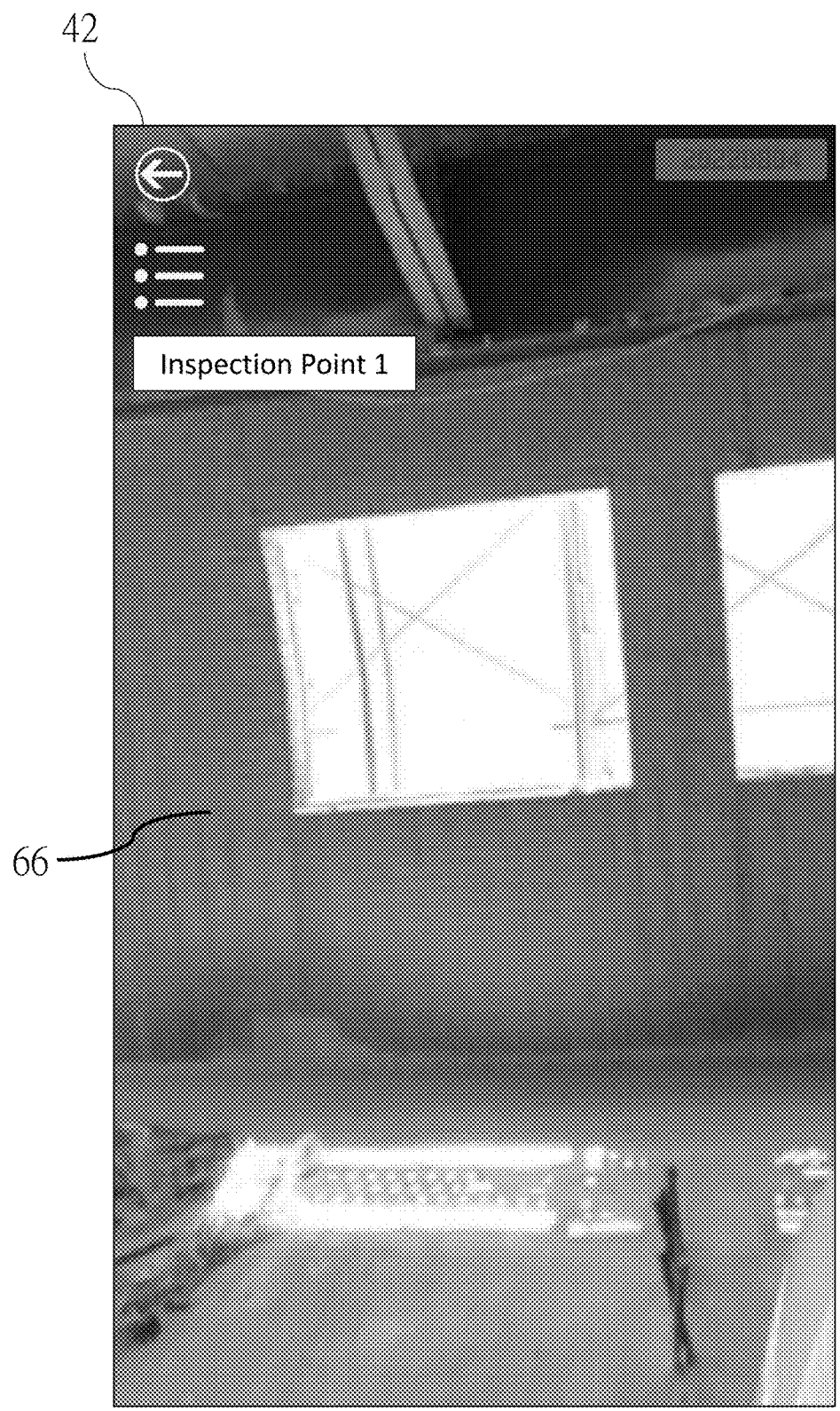
FIG. 7 is a schematic view of the field photo displayed on the screen according to the first embodiment of the present invention.

When the user selects the manipulation icon 62b, the mobile device 40 sends a request command to the server 30, wherein the request command is a request to acquire the at least one field photo. The server 30 acquires the at least one field photo from the digital environment integration platform 10 based on the request command and sends the at least one field photo to the mobile device 40. As shown in FIG. 7, the mobile device 40 displays the at least one field photo 66 on the screen 42, so that the user could manipulate the 360-degree field photo 66 on the screen 42 with fingers to change viewing angles, thereby facilitating comparison of the field photo 66 with the current situations at the construction site.

After the user selects the manipulation icon 62c, the mobile device 40 is linked to the inspection form corresponding to the structural part model 50 through the link acquired to edit the inspection form.

In this way, the user could compare the augmented reality element 58 with the structural part 64 in the environment image 56 to determine whether the structural part 64 in the environment image 56 matches or is consistent with the structural part model 50, and the results of the inspection could be filled in the inspection form through the mobile device 40. The mobile device 40 could further automatically append the image file with the environment image 56 and the another image file with the augmented reality element 58 and the environment image 56 to the inspection form.

Additionally, in the current embodiment, user data of the user, such as a user name, an employee number, etc., could be inputted into the mobile device 40. When the inspection form is edited through the mobile device 40, the mobile device 40 automatically inputs the user data into the inspection form, thereby ensuring that the inspection form is filled out by the user.

In this way, the user could perform the inspection of structural parts in building structures by simply carrying the mobile device 40 and the physical inspection images 20, thereby resolving the problem that requires to search for the structural parts, which are about to be inspected one by one, in the Building Information Modeling or the problem that requires to bring along the paper inspection forms.

Optionally, when the mobile device 40 detects a mismatch between a shape of the structural part 64 in the environment image 56 and a shape of the augmented reality element 58 of the structural part model 50, the mobile device 40 generates a prompt message. The prompt message could be displayed on the screen 42, for example showing "Mismatch detected".

Figure 8:
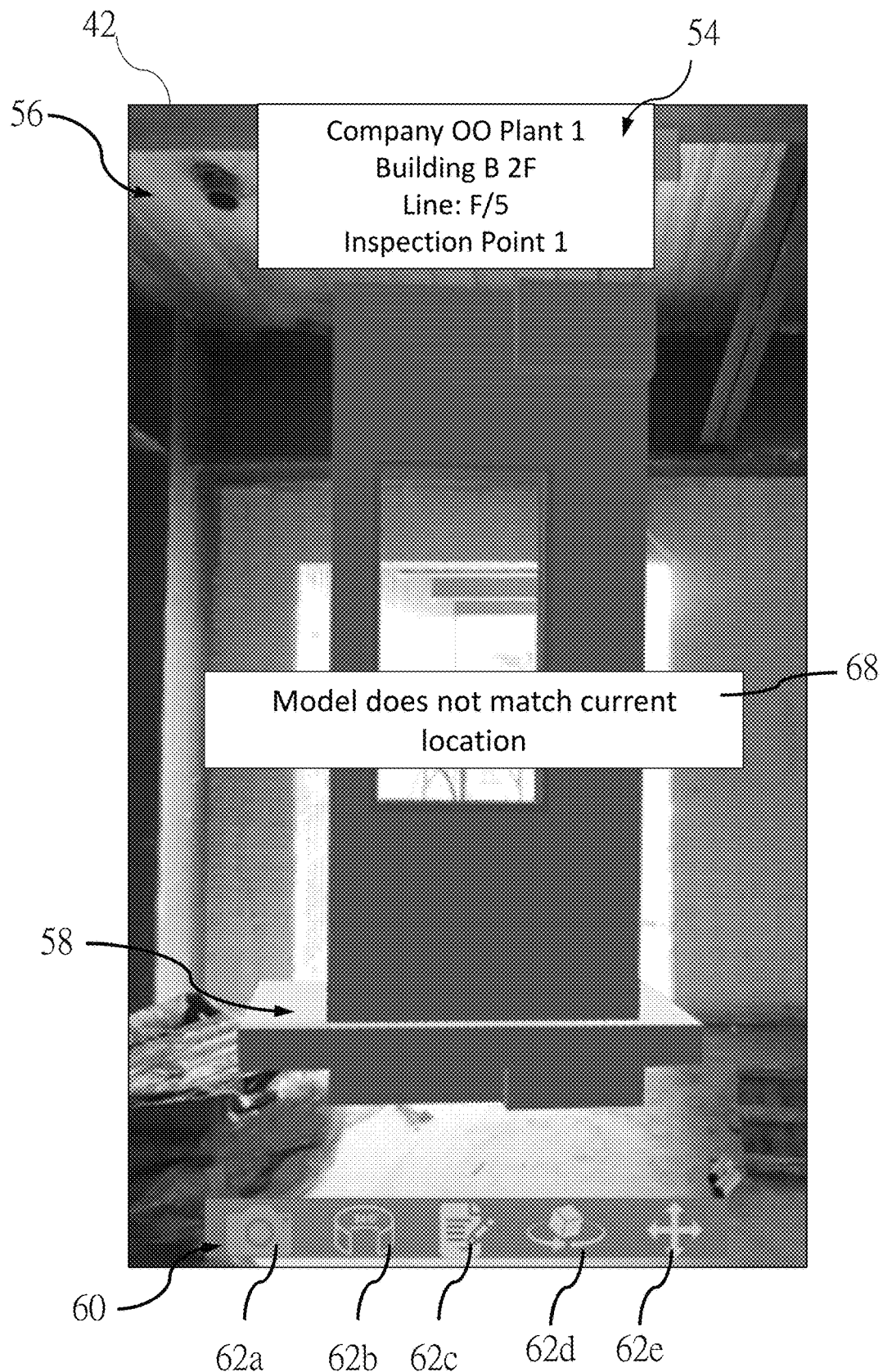
FIG. 8 is another schematic view of the augmented reality element and the environment image displayed on the screen according to the first embodiment of the present invention.

Optionally, when the mobile device 40 detects a match between the positioning data and the location data 54, the mobile device 40 displays the augmented reality element 58 (shown in FIG. 6) on the screen 42. When the mobile device 40 detects a mismatch between the positioning data and the location data 54, the mobile device 40 generates a prompt message 68. For example, as shown in FIG. 8, the prompt message 68, "Model does not match current location", is displayed on the screen 42 to remind the user that the current location is incorrect. In practice, when the mobile device 40 detects a mismatch between the positioning data and the location data 54, the mobile device 40 does not display and/or hide the augmented reality element 58 on the screen 42 but displays the prompt message 68 directly. When the user reaches the correct location and the mobile device 40 detects a match between the positioning data and the location data 54, the augmented reality element 58 is displayed and the prompt message 68 is canceled.

Figure 9:
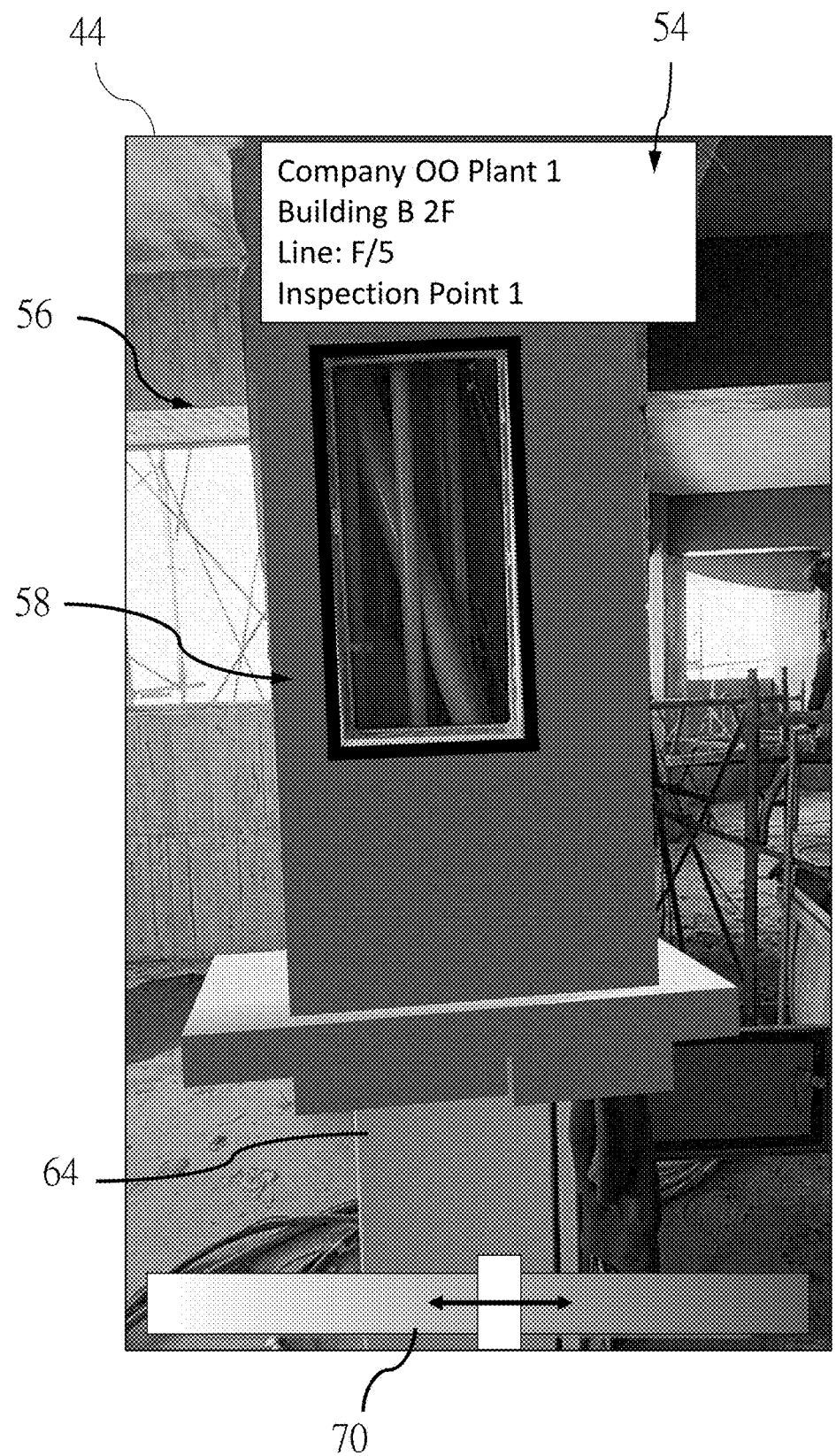
FIG. 9 is a schematic view of the augmented reality element and the environment image displayed on a screen according to a second embodiment of the present invention.

As shown in FIG. 9, an inspection system and an inspection method of building structures according to a second embodiment of the present invention are almost the same as that of the first embodiment, except that when the mobile device 40 displays the augmented reality element 58 on the screen 42, the mobile device 40 further displays a manipulation icon 70 on the screen 42; the manipulation icon 70 is a slider configured to adjust a transparency of the augmented reality element 58. When the user manipulates the manipulation icon 70 on the screen 42, the mobile device 40 adjusts the transparency of at least one portion of the augmented reality element 58. For example, the mobile device 40 could adjust the transparency of the entire augmented reality element 58, so that the user could compare the structural part 64 in the environment image 56 with the augmented reality element 58, which is adjusted to be semi-transparent, through the semi-transparent augmented reality element 58 on the screen 42.

Alternatively, when the user manipulates the manipulation icon 70 on the screen 42, the mobile device 40 adjusts the transparency of the augmented reality element 58; for example, the mobile device 40 adjusts the primary inspection portion 502 of the augmented reality element 58 to be semi-transparent. The mobile device 40 compares the semi-transparent primary inspection portion 502 of the augmented reality element 58 with a portion of the structural part 64 in the environment image 56, that is, the mobile device 40 compares the semi-transparent primary inspection portion 502 with the actual primary inspection portion of the structural part 64; when the semi-transparent primary inspection portion 502 does not match the actual primary inspection portion of the structural part 64, the mobile device 40 generates a prompt message. The prompt message could be displayed on the screen 42, for example showing "Mismatch detected".

With the aforementioned design, the inspection system and the inspection method of the building structures of the present invention could be more convenient for users to perform the inspection of the building structures, thereby effectively streamlining the inspection process of the structural parts.

It must be pointed out that the embodiments described above are only some preferred embodiments of the present invention. All equivalent structures which employ the concepts disclosed in this specification and the appended claims should fall within the scope of the present invention.

What is claimed is:

1. An inspection system of building structures, comprising:
   a digital environment integration platform storing at least one structural part model of a building structure;
   at least one physical inspection image, which is an image of the at least one structural part model;
   a server connected to the digital environment integration platform, the server recording a corresponding relationship between feature data of the at least one physical inspection image and the at least one structural part model, the corresponding relationship further including a link of an inspection form; and
   a mobile device having a camera module and a screen, the mobile device connected to the server;
   wherein the mobile device captures the at least one physical inspection image through the camera module and recognizes the feature data of the at least one physical inspection image; the mobile device sends the feature data recognized to the server;
   wherein the server acquires the at least one structural part model from the digital environment integration platform based on the feature data and the corresponding relationship and sends the at least one structural part model and the link of the inspection form to the mobile device;
   wherein the mobile device captures an environment image through the camera module and displays the environment image on the screen; the mobile device overlays the at least one structural part model acquired as an augmented reality element on the environment image displayed on the screen; the mobile device is linked to the inspection form through the link acquired to edit the inspection form.

2. The inspection system of the building structures as claimed in claim 1, wherein the corresponding relationship further includes location data corresponding to the at least one structural part model; the mobile device has a positioning module configured to acquire positioning data; the server further sends the location data to the mobile device; when the mobile device detects a match between the positioning data and the location data, the mobile device displays the augmented reality element on the screen.

3. The inspection system of the building structures as claimed in claim 2, wherein when the mobile device detects a mismatch between the positioning data and the location data, the mobile device generates a prompt message.

4. The inspection system of the building structures as claimed in claim 2, wherein when the mobile device detects a mismatch between the positioning data and the location data, the mobile device does not display the augmented reality element on the screen.

5. The inspection system of the building structures as claimed in claim 1, wherein the digital environment integration platform includes at least one field photo corresponding to the at least one structural part model; the mobile device sends a request command to the server, wherein the request command is a request to acquire the at least one field photo; the server acquires the at least one field photo from the digital environment integration platform based on the request command and sends the at least one field photo to the mobile device; the mobile device displays the at least one field photo on the screen.

6. The inspection system of building structures as claimed in claim 1, wherein the mobile device has user data; when the mobile device edits the inspection form, the user data is automatically inputted into the inspection form.

7. The inspection system of the building structures as claimed in claim 1, wherein when the mobile device detects a mismatch between a shape of a structural part in the environment image and a shape of the augmented reality element of the at least one structural part model, the mobile device generates a prompt message.

8. The inspection system of the building structures as claimed in claim 1, wherein the at least one structural part model defines a primary inspection portion and a secondary inspection portion; a color of the primary inspection portion is different from a color of the secondary inspection portion; when the mobile device displays the augmented reality element on the screen, the primary inspection portion and the secondary inspection portion are displayed simultaneously.

9. The inspection system of the building structures as claimed in claim 1, wherein the at least one structural part model defines a primary inspection portion and a secondary inspection portion; when the mobile device displays the augmented reality element on the screen, the mobile device adjusts the primary inspection portion on the augmented reality element to be semi-transparent; the mobile device compares the semi-transparent primary inspection portion on the augmented reality element with a portion of a structural part in the environment image; the mobile device generates a prompt message when a mismatch between the semi-transparent primary inspection portion on the augmented reality element and the portion of the structural part in the environment image is detected.

10. The inspection system of the building structures as claimed in claim 1, wherein when the mobile device displays the augmented reality element on the screen, the mobile device adjusts a transparency of at least one portion of the augmented reality element.

11. An inspection method of building structures, comprising steps of:
    providing a digital environment integration platform storing at least one structural part model of a building structure;
    providing at least one physical inspection image, which is an image of the at least one structural part model;
    providing a server connected to the digital environment integration platform; recording, by the server, a corresponding relationship between feature data of the at least one physical inspection image and the at least one structural part model; the corresponding relationship further including a link of an inspection form;
    connecting a mobile device to the server;
    capturing, by the mobile device, the at least one physical inspection image through a camera module and recognizing, by the mobile device, the feature data of the at least one physical inspection image; sending the feature data recognized to the server by the mobile device;
    acquiring the at least one structural part model from the digital environment integration platform by the server based on the feature data and the corresponding relationship and sending the at least one structural part model and the link of the inspection form to the mobile device by the server;
    capturing an environment image through the camera module by the mobile device and displaying the environment image on a screen of the mobile device by the mobile device; overlaying, by the mobile device, the at least one structural part model acquired as an augmented reality element on the environment image displayed on the screen; and
    linking the mobile device to the inspection form through the link acquired to edit the inspection form.

12. The inspection method of the building structures as claimed in claim 11, wherein the corresponding relationship further includes location data corresponding to the at least one structural part model; the mobile device has a positioning module configured to acquire positioning data;
    the inspection method of the building structures further comprises:
    sending the location data to the mobile device by the server; displaying the augmented reality element on the screen by the mobile device when the mobile device detects a match between the positioning data and the location data.

13. The inspection method of the building structures as claimed in claim 12, wherein when the mobile device detects a mismatch between the positioning data and the location data, the mobile device generates a prompt message.

14. The inspection method of the building structures as claimed in claim 12, wherein when the mobile device detects a mismatch between the positioning data and the location data, the mobile device does not display the augmented reality element on the screen.

15. The inspection method of the building structures as claimed in claim 11, wherein the digital environment integration platform includes at least one field photo corresponding to the at least one structural part model;
    the inspection method of the building structures further comprises:
    sending, by the mobile device, a request command to the server, wherein the request command is a request to acquire the at least one field photo; acquiring the at least one field photo from the digital environment integration platform by the server based on the request command and sending the at least one field photo to the mobile device by the server; displaying the at least one field photo on the screen by the mobile device.

16. The inspection method of the building structures as claimed in claim 11, wherein the mobile device has user data; when the mobile device edits the inspection form, the user data is automatically inputted into the inspection form.

17. The inspection method of the building structures as claimed in claim 11, further comprising:
    generating, by the mobile device, a prompt message when the mobile device detects a mismatch between a shape of a structural part in the environment image and a shape of the augmented reality element of the at least one structural part model.

18. The inspection method of the building structures as claimed in claim 11, wherein the at least one structural part model defines a primary inspection portion and a secondary inspection portion; a color of the primary inspection portion is different from a color of the secondary inspection portion; when the mobile device displays the augmented reality element on the screen, the primary inspection portion and the secondary inspection portion are displayed simultaneously.

19. The inspection method of the building structures as claimed in claim 11, wherein the at least one structural part model defines a primary inspection portion and a secondary inspection portion; when the mobile device displays the augmented reality element on the screen, the mobile device adjusts the primary inspection portion on the augmented reality element to be semi-transparent; the mobile device compares the semi-transparent primary inspection portion on the augmented reality element with a portion of a structural part in the environment image; the mobile device generates a prompt message when a mismatch between the semi-transparent primary inspection portion on the augmented reality element and the portion of the structural part in the environment image is detected.

20. The inspection method of the building structures as claimed in claim 11, wherein when the mobile device displays the augmented reality element on the screen, the mobile device adjusts a transparency of at least one portion of the augmented reality element.

\* \* \* \* \*